US008663478B2

(12) United States Patent
Coste et al.

(10) Patent No.: US 8,663,478 B2
(45) Date of Patent: Mar. 4, 2014

(54) METHOD FOR TREATING WATER BY ADVANCED OXIDATION AND BALLASTED FLOCCULATION, AND CORRESPONDING TREATMENT PLANT

(75) Inventors: Marielle Coste, Paris (FR); Arnaud Bucaille, Hong Kong (HK); Sebastien Logette, Taverny (FR)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 537 days.

(21) Appl. No.: 12/808,526

(22) PCT Filed: Nov. 27, 2008

(86) PCT No.: PCT/EP2008/066286
§ 371 (c)(1),
(2), (4) Date: Jul. 29, 2010

(87) PCT Pub. No.: WO2009/083346
PCT Pub. Date: Jul. 9, 2009

(65) Prior Publication Data
US 2011/0127220 A1    Jun. 2, 2011

(30) Foreign Application Priority Data
Dec. 20, 2007    (FR) ..................................... 07 60141

(51) Int. Cl.
| B01D 15/00 | (2006.01) |
| B03D 1/00 | (2006.01) |
| C02F 1/52 | (2006.01) |
| B01D 21/01 | (2006.01) |
| C02F 1/72 | (2006.01) |

(52) U.S. Cl.
USPC ........... 210/667; 210/704; 210/713; 210/723; 210/759

(58) Field of Classification Search
USPC ......... 210/667, 663, 702, 712, 713, 714, 715, 210/716, 719, 722, 749, 757, 758, 759, 723, 210/724, 725, 726, 730, 704
See application file for complete search history.

(56) References Cited

U.S. PATENT DOCUMENTS

| 4,321,143 A * | 3/1982 | Wilms et al. .................. 210/631 |
| 5,611,928 A * | 3/1997 | Savolainen et al. ........... 210/631 |
| 6,322,701 B1 * | 11/2001 | Delighiannis ................. 210/620 |
| 6,582,605 B2 * | 6/2003 | Krulik et al. .................. 210/638 |
| 6,589,427 B2 * | 7/2003 | Moghe et al. .................. 210/667 |
| 6,645,386 B1 * | 11/2003 | Moreau et al. ................. 210/711 |
| 7,311,841 B2 * | 12/2007 | Binot et al. .................... 210/666 |
| 2002/0153329 A1 | 10/2002 | Hempel et al. |
| 2003/0173306 A1 | 9/2003 | Cha et al. |

FOREIGN PATENT DOCUMENTS

| DE | 102004029072 | 1/2006 |
| FR | 2464230 | 3/1981 |
| FR | 2868064 | 9/2005 |
| WO | 99/21801 | 5/1999 |

OTHER PUBLICATIONS

Environmental Separation of Heavy Metals:Engineering Processes, 2001, CRC Press, p. 182.*
Suthersan et al., InSitu Remediation Engineering, 2005, CRC Press, p. 291.*

* cited by examiner

*Primary Examiner* — Nam Nguyen
*Assistant Examiner* — Claire Norris
(74) *Attorney, Agent, or Firm* — Coats and Bennett PLLC

(57) ABSTRACT

The invention relates to a method for treating water charged with colloidal impurities, either dissolved or suspended, in a treatment plant, wherein said method comprises: the step of contacting said water, in an advanced oxidation area, with hydrogen peroxide in the presence of at least one transition-metal salt; a flocculation step that comprises contacting said water, in a flocculation area, with at least one flocculation additive and with at least one ballast comprising at least one non-soluble granular material denser than water and used as a biomass carrier; the step of feeding the water and floc mixture thus obtained into a settling area; the step of separating the treated water at the upper portion of said settling area from a mixture of sludge and ballast resulting from the settling of said flocs; the step of extracting the sludge and ballast mixture at the lower portion of said settling area; and the step of recycling at least a portion of the sludge into said advanced oxidation area.

23 Claims, 4 Drawing Sheets

METHOD FOR TREATING WATER BY ADVANCED OXIDATION AND BALLASTED FLOCCULATION, AND CORRESPONDING TREATMENT PLANT

This application is a U.S. National Stage Application of PCT Application No. PCT/EP2008/066286, with an international filing date of 27 Nov. 2008. Applicant claims priority based on French Patent Application No. 0760141 filed 20 Dec. 2007. The subject matter of these applications is incorporated herein.

FIELD OF THE INVENTION

The field of the invention is that of water treatment.

More precisely, the invention relates to the treatment of wastewater which simultaneously comprises specific organic and/or colloidal pollution and dissolved pollution.

In particular, this invention relates to the treatment of liquid industrial effluents and municipal water treatment.

This wastewater frequently comprises a specific pollution, colloidal pollution and dissolved pollution. The dissolved pollution includes easily biodegradable dissolved pollution expressed by the BOD (Biological Oxygen Demand) content soluble in water, which is treated via a biological treatment, and the non-biodegradable to poorly biodegradable dissolved pollution, expressed by the hard or refractory COD (Chemical Oxygen Demand) content, which is treated by means of chemical products.

PRIOR ART

The specific and/or colloidal pollution suspended in the water is normally and relatively easily treated by physico-chemical means, substantially by direct decantation or by decantation preceded by coagulation and/or flocculation.

The soluble and easily biodegradable pollution is normally treated by biological means, i.e., by placing the water being treated in contact with one or more biomasses containing bacteria capable of degrading same.

DISADVANTAGES OF THE PRIOR ART

Treatment of the organic pollution of wastewater, particularly that of industrial origin (chemical, pharmaceutical, textile industries), or of municipal origin, which may comprise a strong pollution component of industrial origin, involves relatively long treatment times. The length of these treatment times is related, in particular, to the nature of certain poorly biodegradable molecules, and to the inherent slowness of the biological processes normally implemented.

Furthermore, biologically treated industrial water generally contains a relatively high proportion of residual COD requiring subsequent chemical treatment.

Certain advanced oxidation techniques have been implemented for the purpose of reducing the difficult-to-dissolve and non-biodegradable pollution of an effluent.

Ranked amongst these advanced oxidation techniques are those implementing Fenton's reagent, which enables free OH* radicals to be generated from hydrogen peroxide in the presence of a transition metal such as iron, via the following reactions:

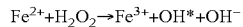

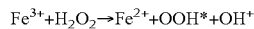

The OH* hydroxyl radicals thus generated react with a broad range of organic pollutants in order to oxidise same.

These advanced oxidation techniques have thus far been used in combination with coagulation, flocculation and decantation techniques so as to simultaneously reduce the specific, colloidal and soluble pollution of the effluents.

The international patent application bearing the number WO 99/21801 thus describes a water treatment method using a combination of advanced oxidation and coagulation, flocculation and decantation.

This method enables specific pollution and the dissolved organic pollution to be treated simultaneously. However, the use of such a method involves relative long water treatment times of a minimum of 1 hour and 40 minutes and possibly reaching more than 5 hours.

The United States patent application bearing the number US-A1-2002/153329 likewise describes such a method, which further requires the use of a heterogeneous catalyst.

Such a method likewise involves treatment times of a minimum of 4 hours and possibly reaching 24 hours, and likewise has the disadvantage of requiring the use of a heterogeneous catalyst involving a significant cost item.

Such treatment methods also have the disadvantage of requiring structures of a considerable size, and of being relatively costly. The use of same is thus uncommon.

OBJECTIVES OF THE INVENTION

One objective of the invention in particular is to mitigate these disadvantages of the prior art.

More precisely, one objective of the invention is to provide a wastewater treatment technique which, in at least one embodiment, enables the specific pollution, the colloidal pollution and the dissolved pollution to be treated simultaneously.

In at least one embodiment, the invention likewise has the objective of reducing the residual COD concentration of water collected, for example, after biological treatment.

Another objective of the invention is to implement such a technique which, in at least one embodiment, enables the time for wastewater treatment to be reduced considerably.

In at least one embodiment, the invention likewise has the objective of providing such a technique which results in accelerating the wastewater treatment.

In at least one embodiment, the invention also has the objective of providing such a technique which is reliable, and the implementation of which is simple and inexpensive.

DISCLOSURE OF THE INVENTION

These objectives, as well as others which will become apparent later, are achieved by means of a method of treating water charged with colloidal impurities, either dissolved or in suspension, in a treatment plant.

According to the invention, said method includes:
a step of placing said water, in an advance oxidation area, in contact with hydrogen peroxide in the present of at least one transition-metal salt;
a flocculation step consisting in placing said water, in a flocculation area, in contact with at least one ballast consisting of at least one flocculant and with at least one insoluble granular material denser than water;
a step of introducing the water and floc mixture thus formed into a settling area;
as step of separating the treated water at the upper portion of said settling area with a mixture of sludge and ballast resulting from the settling of said floc;
a step of extracting the mixture of sludge and ballast at the lower portion of said settling area;

a step of recycling at least a portion of the sludge into said advanced oxidation area 10.

The invention is thus based on an innovative approach to the treatment of wastewater, which consists in combining an advanced oxidation treatment with an adsorbent treatment and a coagulation, flocculation and ballasted settling treatment.

Such an approach makes it possible to treat specific pollutions, colloidal pollutions and a high proportion of the non- or poorly biodegradable dissolved pollutions simultaneously and in very short time periods, or at the very least in time periods shorter than the treatment times required when implementing the techniques according to the prior art.

Furthermore, the fact of recycling at least a portion of the sludge derived from the settling process in the advanced oxidation area enables recycling of the metals which are deposited on the ballast and/or which are precipitated as fine particles of high-density metallic oxides over the course of the method. These metals and/or oxidised metals comprise "active metals" the presence of which contributes to improving the kinetics of the advanced oxidation reaction and to reducing the time required to treat the effluent.

As a matter of fact, the dissolved metals contribute to accelerating the treatment via Fenton's reaction. Metals in the form of oxides and/or oxyhydroxides accelerate the oxidation reaction and the oxyhydroxides provide an adsorbent effect.

Furthermore, recycling of the sludge and ballast promotes the increase of adsorbent mineral species of the iron oxyhydroxide type (FeOOH) created in situ, which contribute to the elimination of the organic matter via adsorption, as well as the elimination of the soluble metals present in the effluent. This likewise contributes to improving the reduction in dissolved pollution.

The implementation of a step of introducing an adsorbent agent into the water being treated can advantageously be anticipated.

The method according to the invention thus consists of a method enabling water treatment to be accelerated.

According to one advantageous characteristic of the invention, the time period separating the placement of said water in contact with the hydrogen peroxide and the separation of the treated water is less than 1 hour.

Implementation of the invention thus enables a high proportion of the residual COD to be reduced in a short time period, at the very least in comparison with the techniques of the prior art.

The treatment method according to the invention preferably includes a sludge/ballast hydrocyclone separation step.

It can likewise be provided for the sludge/ballast separation to be obtained by another physical or gravity-type means such as a magnet, a filter or a settling tank.

In this case, it advantageously includes a step of recycling the underflow of said hydrocyclone separation step into said flocculation area.

It may also include, according to a preferable characteristic, a recycling step of the separation underflow of said separation by hydrocyclone step in said advanced oxidation area.

The hydrocyclone separation underflow consists of a mixture composed of a high proportion of ballast and metals which are precipitated as fine particles of high-density metallic oxides over the course of the method (and of sludge residues).

Recycling of the ballast thus enables these metallic oxide particles to be recycled. The kinetics of the advanced oxidation reaction is then improved, owing thereto, and the time required to treat the effluent is reduced.

The treatment method according to the invention preferably includes a step of recycling a portion of the sludge derived from the overflow of said hydrocyclone separation step into said advanced oxidation area.

Recycling of the sludge which contains active metals leads to an acceleration of the advanced oxidation and therefore the treatment.

Furthermore, recycling of the sludge and the ballast contributes to improving the reduction of dissolved pollution. As a matter of fact, as already explained, it promotes the increase in adsorbent mineral species of the iron oxyhydroxide type (FeOOH), created in situ, which promote the elimination of the organic matter by adsorption, as well as the elimination of the soluble metals present in the effluent.

According to one advantageous characteristic of the invention, the treatment method according to the invention includes a step of placing said water in contact with at least one coagulating salt in a coagulation area.

In this case, said coagulating salt is preferably ferric chloride.

The use of ferric chloride contributes in part to providing the sludge and ballast mixture with active metals, which, during recycling of the sludge and/or ballast, are involved in accelerating the treatment.

Said transition-metal salt is advantageously chosen from the group consisting of the following metals: iron and copper.

The use of this type of transition metal enables good oxidation to be obtained.

According to a preferred characteristic, said flocculation step includes a ripening step in a ripening area positioned upstream from said settling area.

The ripening step makes it possible to ensure that the oxidation reactions, coagulation and flocculation are completed prior to starting the settling step, thereby enabling the result thereof to be improved.

Said water is preferably placed in contact with said flocculant at least one minute after placing said water in contact with each of said salts.

This enables the flocculation to be initiated after oxidation and coagulation of the dissolved pollution and to thus promote the formation of floc.

The residence time of said contact with the hydrogen peroxide in said advanced oxidation area is between 2.5 and 45 minutes, and preferably between 7 and 20 minutes.

Such time periods enable obtainment of an appropriate level of oxidation of said dissolved pollution.

According to a preferred characteristic, the residence time of said contact with said flocculant and said ballast in said flocculation and/or ripening area is greater than 3 minutes, and preferably between 5 and 15 minutes.

Such time periods enable obtainment of an effective degree of flocculation and the formation of solid floc. This contributes to facilitating the subsequent settling of the floc and to increasing the mirror settling speed.

The flow rate of said water via the horizontal surface of said settling area is greater than 15 m/h, and is preferably between 30 and 120 m/h.

Such settling speeds enable the overall water treatment time to be reduced.

The invention likewise relates to a water treatment plant for implementing the water treatment method according to the invention. Such a plant includes:
- an advanced oxidation area provided with means of injecting hydrogen peroxide, means of injecting said transition-metal salt, and at least one stirrer;
- a pipeline for feeding said water into said advanced oxidation area;

a flocculation area provided with means of injecting said flocculant and at least one stirrer;

means of injecting said ballast, which are connected to said flocculation area or to said advanced oxidation area;

a settling area provided with an outlet for said treated water at the upper portion, and with an outlet for said mixture of sludge and ballast at the lower portion;

means of recycling at least a portion of the sludge into said advanced oxidation area.

A plant according to the invention preferably includes a coagulation area, which is upstream from said flocculation area and which is provided with at least one stirrer and means of injecting said coagulating salt.

It is thus possible to proceed with a coagulation step so as to facilitate the formation of the floc.

According to one advantageous characteristic, a plant according to the invention includes a ripening area, which positioned upstream from said settling area and which is provided with at least one stirrer.

The implementation of such a ripening area enables an appropriate degree of flocculation to be ensured so as to improve the subsequent settling of the floc.

Said flocculation area and said ripening area are advantageously merged.

This enables the plant to be simplified without thereby degrading the quality of the results obtained by implementing the method according to the invention.

According to a preferred characteristic, at least one of said stirrers is surrounded by a substantially cylindrical and vertical flow guide.

This enables a good mixture to be obtained, while at the same time limiting the shear rates, and therefore aids in preventing the floc formed from being broken up.

LIST OF THE FIGURES

Other characteristics and advantageous of the invention will become more apparent upon reading the following description of preferred embodiments, which are given for illustrative and non-limiting purposes only, and from the appended drawings, in which.

DESCRIPTION OF AN EMBODIMENT OF THE INVENTION

1. Recall of the Principle of the Invention

The general principle of the invention is based on the combined implementation of an advanced oxidation area associated with ballasted flocculation/settling and recycling of at least a portion of the sludge formed into the advanced oxidation area, so as to treat the specific pollutions, colloidal pollutions and easily or poorly biodegradable soluble pollutions simultaneously and in relatively short periods of time.

Such an approach enables wastewater to be treated rapidly and to significantly reduce the residual COD thereof.

2. Example of a First Embodiment of a Plant According to the Invention

Figure 1:
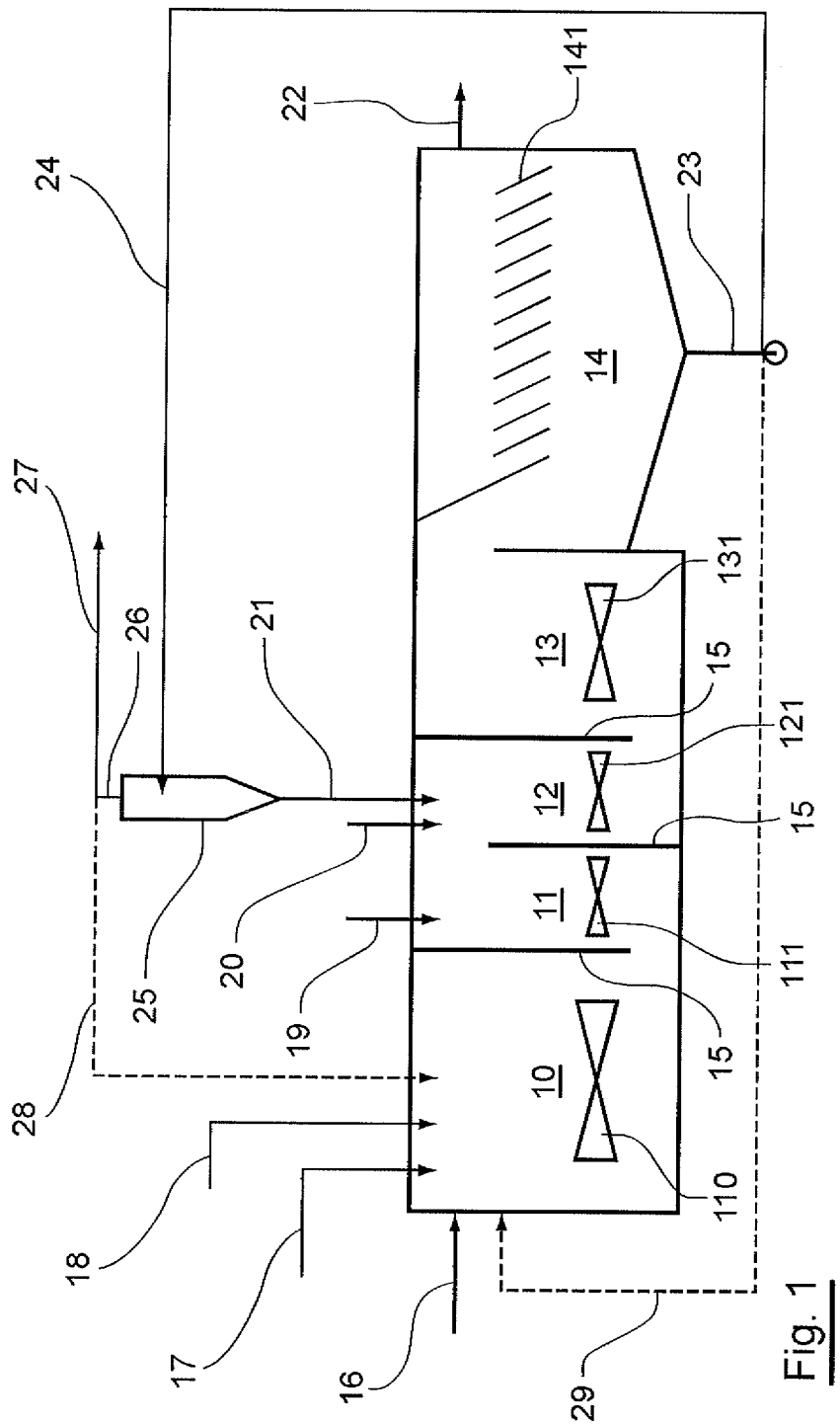
FIG. 1 shows a schematic representation of a first embodiment of a water treatment plant according to the invention.

An embodiment of a water treatment plant according to the invention is shown in connection with FIG. 1.

As shown in FIG. 1, such a plant includes an advanced oxidation area 10, a coagulation area 11, a flocculation area 12, and a ripening area 13, arranged one after the other and each accommodating a stirrer 110, 111, 121, 131.

A settling area 14 is arranged downstream from the ripening area 13. At the upper portion, it accommodates a plurality of inclined plates 141. In other embodiments, the plates 141 may extend in a substantially vertical direction or else not be present.

These areas 10, 11, 12, 13 and 14 are separated from one another by means of walls 15 designed such that these areas are interconnected.

An inlet pipeline 16 for an effluent being treated opens out into an advanced oxidation area 10. Furthermore, the advanced oxidation area 10 is provided with injection means 17, e.g., an injector, for hydrogen peroxide, and means of injecting 18 a transition-metal salt.

As seen in FIG. 1, the coagulation area 11 is provided with means of injecting a coagulating salt.

The flocculation area 12 is provided with means of injecting 20 a flocculant, and means of injecting a ballast 21.

The settling area 14 is provided at the upper portion thereof with an outlet 22 for a treated effluent, and at the lower portion thereof for a mixture of sludge and ballast.

The lower outlet 23 of the settling area 14 is connected via a recycling pipeline 24 to a hydrocyclone 25 (or any other means, e.g., such as a settling tank, a magnet filter . . . ) the underflow 21 of which is connected to the flocculation area 12 and the overflow 26 of which is connected to an excess sludge extraction pipeline 27.

As seen in this FIG. 1, a portion of the overflow 26 is connected to a pipeline 28 for recycling a portion of the sludge into the advanced oxidation area 10.

As also seen in this FIG. 1, in an alternative to this embodiment, provisions can be made for the lower outlet 23 of the settling area to be connected to the advanced oxidation area 10 via a pipeline 29.

3. Example of a Second Embodiment of a Plant According to the Invention

Figure 2:
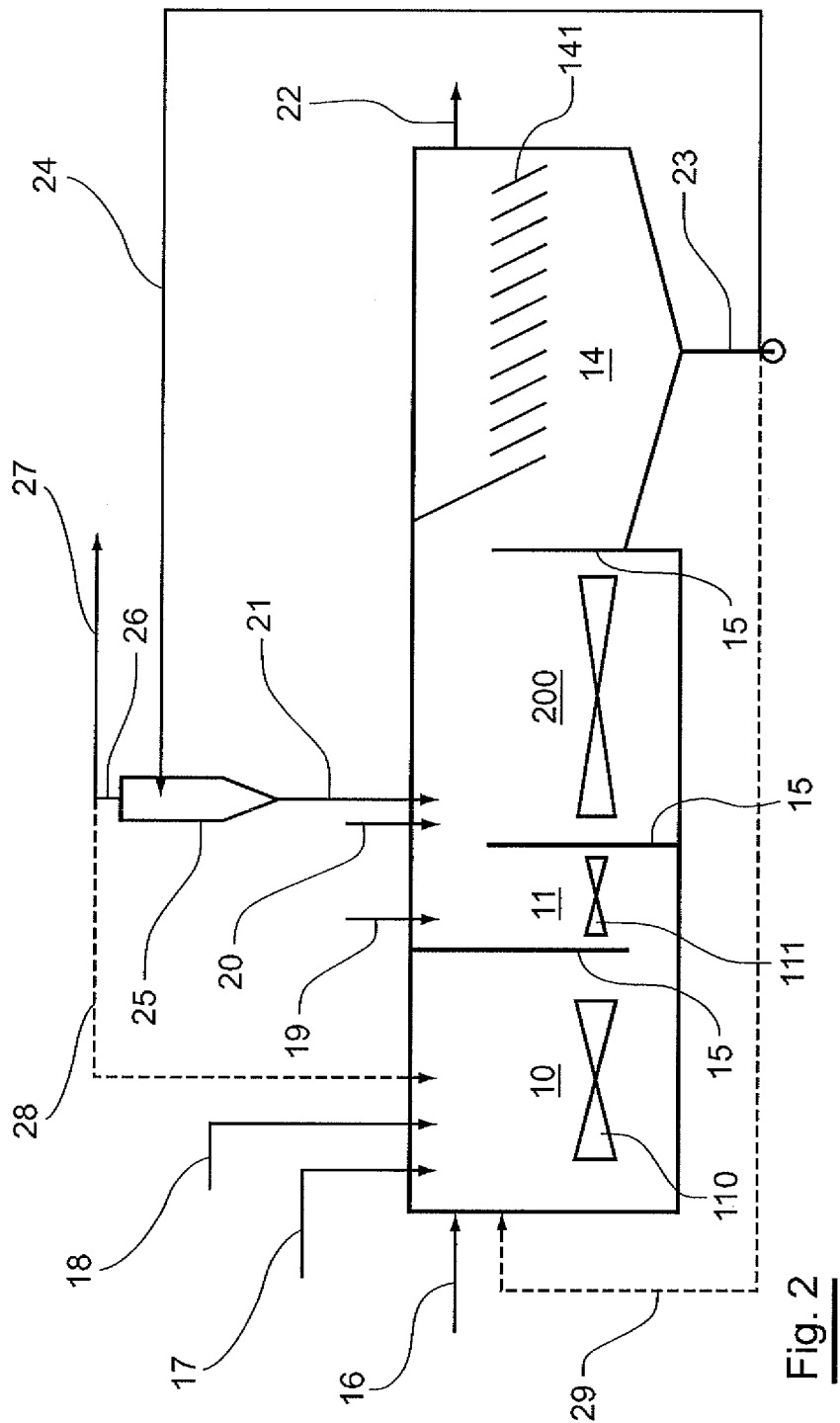
FIG. 2 shows a schematic representation of a second embodiment of a water treatment plant according to the invention, wherein the flocculation and ripening areas are joined together in a single area.

FIG. 2 shows a second embodiment of a water treatment plant according to the invention.

Such a plant implements numerous elements equivalent to those implemented in the plant according to the first embodiment described above, and which bear the same numerical references.

In this second embodiment, provisions are made for the flocculation area 12 and the ripening area 13 to be joined together in a single tank 200, which is provided with means of injecting a flocculant 20 and means of injecting a ballast 21.

4. Example of a Third Embodiment of a Plant According to the Invention

Figure 3:
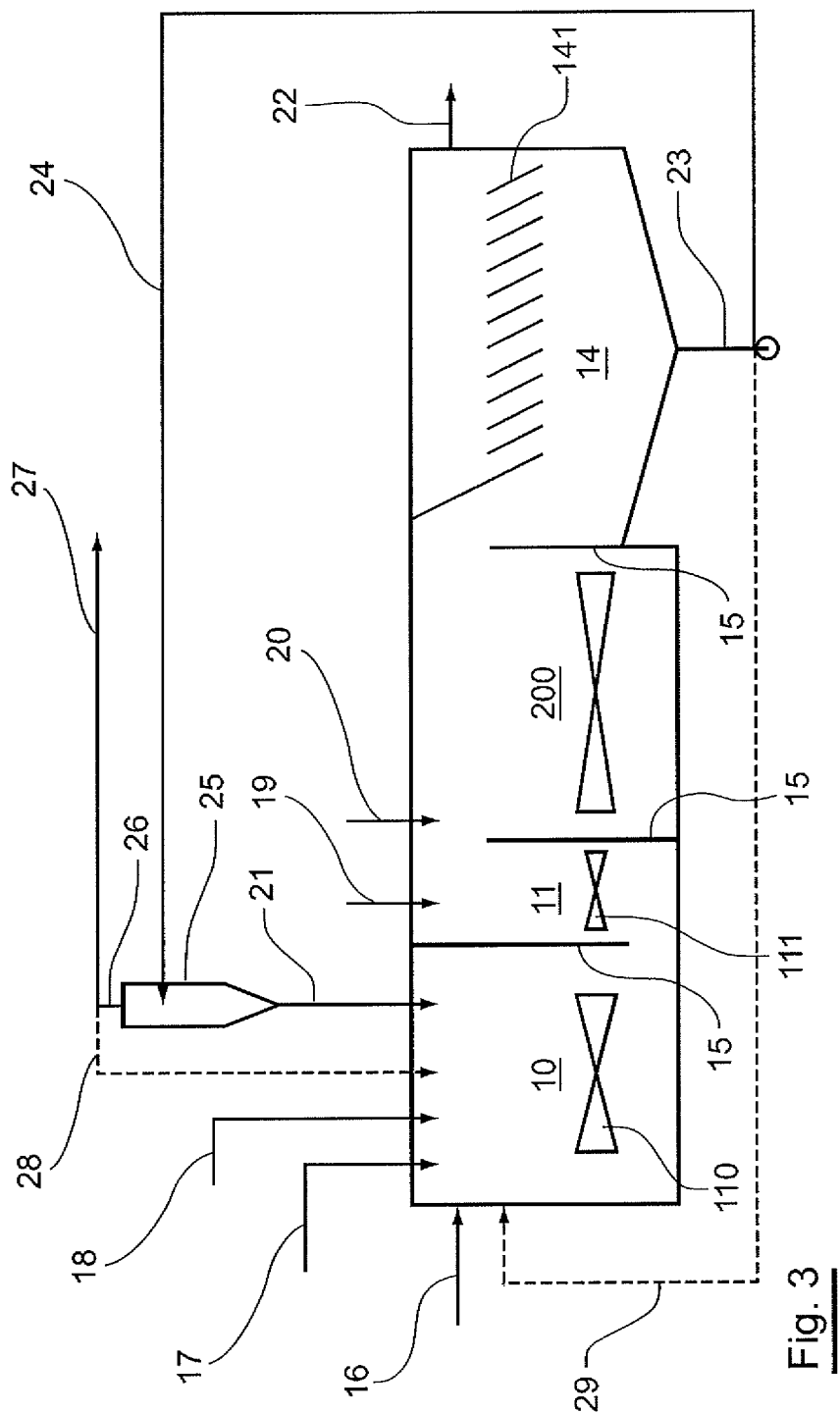
FIG. 3 shows a schematic representation of a third embodiment of a water treatment plant according to the invention, wherein the underflow and a portion of the overflows are recycled into the advanced oxidation area.

A third embodiment of the treatment plant according to the invention is shown in connection with FIG. 3.

As shown, such an installation implements means equivalent to those implemented in the second embodiment described above. However, this plant according to the third embodiment differs from the plant according to the second embodiment by the fact that the ballast-injecting means 21 are connected to the advanced oxidation area 10.

5. Alternatives

Figure 4:
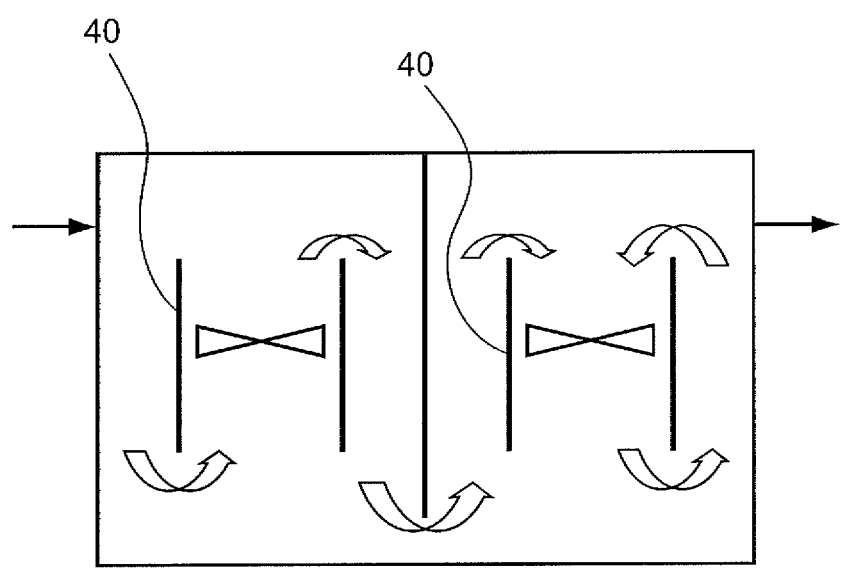
FIG. 4 shows a schematic representation of an alternative capable of being implemented in the embodiments described and according to which the stirrers are housed inside flow guides.

FIG. 4 shows an alternative capable of being implemented equally in each of the embodiments described above.

This alternative consists in providing for the stirrers, or at the very least some of them, to be housed inside flow guides 40 having the shape of tubes of circular cross-section.

Another alternative can consist in providing for the implementation of means measuring (not shown) information representative of a pH value in the advanced oxidation area 10 and/or upstream or downstream from the settling area 14, and means of injecting at least one pH adjustment reagent into the advanced oxidation area 10 and/or upstream or downstream from the settling area 14.

One alternative may likewise consist in implementing a system for scraping the mixture of sludge and ballast at the bottom of the settling area 14.

6. Water Treatment Method According to the Invention

An exemplary water treatment method according to the invention will now be described.

Such a treatment method can, for example, be implemented in one of the water treatment plants according to the invention, as described above.

The method consists in introducing an effluent to be treated into the advanced oxidation area 10 by means of the inlet pipeline 16. The effluent introduced into the advanced oxidation area 10 is placed in contact, under agitation, with hydrogen peroxide in the presence of a transition-metal salt, by activating the injection means 17 and 18.

The transition-metal salt is preferably an iron salt, and advantageous a ferrous salt such as ferrous sulphate. In another embodiment, it can be provided for the transition metal implemented to be copper.

It is noted that the contact time between the effluent and the hydrogen peroxide is advantageously between 2.5 and 45 minutes, and preferably between 7 and 20 minutes.

The effluent is next directed into the coagulation area 11 in which it is placed in contact with a coagulating salt, preferably an iron salt such as ferric chloride, by activating the injection means 19.

In an alternative, the ferrous salt and the iron salt may be introduced into the advanced oxidation area 10. To accomplish this, the injection means 19 will be provided in the advanced oxidation area 10.

The effluent is next placed in contact, under agitation, with a flocculant in the flocculation area 12. The flocculant is preferably a flocculating polymer, e.g., such as polyacrylamide. The effluent is placed in contact with the flocculant advantageously at least one minute after each of the salts has been introduced.

The effluent is likewise placed in contact in this flocculation area 12 with at least one granular material (or ballast) which is denser than the effluent, by activating the injection means 21. The granular material preferably consists of fine sand the effective diameter can advantageously be between 50 and 200 micrometers. However, the granular material can also be magnetite, other mineral oxides containing iron or copper, synthetic or natural mineral polyoxides, magnesium oxides (e.g., hydrotalcite), aluminium (e.g., activated alumina). The grain-size distribution used is similar for that of the sand, with a larger developed surface area enabling better adsorption.

The granular material can be introduced into the flocculant. In alternatives, it can be injected upstream from the flocculant-injecting means, advantageously into the oxidation area 10. In other alternatives, it may be introduced equally at any point.

The effluent is kept in contact with the granular material and the flocculant for at least 3 minutes, and preferably for a time period of between 5 and 15 minutes. When the ripening area 13 is implemented, the effluent can advantageously be kept in contact therein with the granular material and the flocculant.

The mixture of effluent and floc formed in the flocculation area 12 is directed towards the settling area 14, advantageously at a mirror speed greater than 15 m/h, and preferably between 30 and 120 m/h.

It is noted that the "mirror speed" is defined as being equal to the ratio of the flow rate of water being treated, expressed in $m^3/h$ and the horizontal surface area of the settling area, expressed in $m^2$.

The treated water is next separated from a mixture of sludge and granular material resulting from the settling of the floc, and then discharged via outlet 22.

As for the mixture of sludge and ballast, it is extracted at the lower portion of the settling area 14 via outlet 23.

The mixture of sludge and ballast is next conveyed in the direction of a hydrocyclone 25 by means of a pipeline 24, for the purpose of separating them from one another, at the very least partially.

The underflow 21 of the hydrocyclone, consisting of a mixture containing a high proportion of ballast, and metals which are precipitated as fine particles of high-density metallic oxides over the course of the method (and sludge residues), is recycled into the flocculation area 12. In another embodiment, the underflow 21 can be recycled directly into the advanced oxidation area 10.

Recycling of the ballast makes it possible to recycle the metals deposited on the ballast and/or precipitated as fine particles of metallic oxides, as indicated above. More precisely, a portion of the metals is deposited on the ballast and the other portion precipitates. The heaviest forms of the portion which precipitates follow the ballast, whereas the less dense forms follow the sludge. This contributes to improving the catalysis of the advanced oxidation reaction and to reducing the time required to treat the effluent.

The overflow 26, consisting of a mixture containing a high proportion of sludge (and possibly a ballast residue), is discharged by means of an outlet pipeline 27 for the excess sludge.

A portion of the overflows 26 of the hydrocyclone 25 is recycled, by means of pipeline 28, into the advanced oxidation area 10. If can likewise be provided for same to be recycled into the coagulation area 11. Because the recycled sludge contains active metals, this enables the advanced oxidation to be accelerated. In this regard, it bears noting that the separation of the sludge and ballast by means of the hydrocyclone tends to increase the concentration of metallic precipitates contained in the overflow 26.

Furthermore, recycling of the sludge and ballast promotes the increase of adsorbent mineral species of the iron oxyhydroxide type (FeOOH) created in situ, which contribute to the elimination of the organic matter via adsorption, as well as the elimination of the soluble metals present in the effluent. This likewise contributes to improving the reduction in dissolved pollution.

In another alternative, a portion of the sludge and ballast mixture extracted at the lower portion of the settling area is directly recycled into the forced oxidation area. This can enable advantage to be taken from the additional catalysis which the precipitated metallic compounds in the sludge may provide. This may appear to be useful in particular in the case where the effluent is highly charged with soluble pollution, e.g., above 300 mg/l of soluble COD, and lightly charged with SS. It is noted that the percentage of recycled sludge may be increased by increasing the diameter of the hydrocyclone underflow, thereby enabling the heaviest, most active metal-laden sludge to be selected.

In an alternative of the method according to the invention, said method can include a step consisting in measuring the pH value in the advanced oxidation area 10 and/or upstream or downstream from the settling area 14, and a step of injecting at least one pH adjustment reagent into the oxidation area 10 and/or upstream or downstream from the settling area 14, so as to maintain the pH value therein at between 3 and 6 and 6 and 8, respectively.

Implementing a method according to the invention makes it possible to reduce the water treatment time and, in particular, to limit the time that elapses between the time when the water is placed in contact with the hydrogen peroxide and the extraction of the treated water to one hour at most, while at the same time making it possible to reduce the residual COD contained in the treated water collected after treatment.

A reduction such as this in the water treatment time can be explained by the implementation of a ballasted floc-settling operation, which makes it possible to reduce the settling time, but to likewise result in an excellent reduction in the fine particles formed during the advanced oxidation reaction, which appear to be quickly trapped in the rapidly settling ballasted floc.

However, recycling of the ballast and sludge plays an important role in reducing the water treatment time according to the invention, in that it makes it possible to reduce the required pre-settling contact time:

the solidity of the floc enables significant velocity gradients in flocculation, thereby bringing about an improvement in the reaction exchanges and a decrease in the required contact time for the reaction;

recycling of the ballast makes it possible to recycle the metals which have been deposited on the grains of sand or precipitated as high-density metallic particles, thereby improving the catalysis of the advanced oxidation reaction;

recycling of a portion of the sludge, which contains active metals, can enable the advanced oxidation reaction to be accelerated, while increasing the concentration of the metals in the active form thereof;

recycling of the sludge and ballast promotes the increase in the concentration of adsorbent mineral species promoting the elimination of the organic matter by adsorption, as well as the elimination of soluble metals present in the effluent.

7. Tests

The following tests were conducted at an industrial pilot plant measuring 50 m³/h, such as the one shown in FIG. 1, treating fine chemical effluents, effluents from the dye and artificial textile industries, and having the following characteristics:

introduction of ferrous sulphate at rates of between 50 and 200 mg/l;

introduction of hydrogen peroxide at rates of between 6 and 11 mg/l on-line, upstream from the coagulation area;

contact times of 2.5 minutes at a non-adjusted pH (usually between 7 Mid 7.5) prior to entering the coagulation area;

agitated coagulation for 5 minutes prior to injecting ferric chloride at rates of between 300 and 600 mg/l;

agitated flocculation with accommodation of the sandy ballast (effective diameter of 125 micrometers), with 1.9 mg/l of a polymer for a residence time of 5 minutes;

flocculation ripening for 10 minutes;

extraction of the mixture of sand and sludge at a rate of 11 m³/h including 2.5 m³/h of recycled sand in the flocculation area.

The tests were conducted with effluents coming from a biological treatment and further comprising 225 to 324 mg/l of total COD, 194 to 240 mg/l of filtered COD (on 0.45-micrometer paper), almost of the refractory type since derived from a biological treatment, and 19 to 46 mg/l of SS.

The tests demonstrated a notable increase in the reduction efficiency:

of the filtered COD (representative of the soluble COD), which shifted from a value of 21% without any use of hydrogen peroxide to a value of 37% with hydrogen peroxide;

of the total COD, which shifted from an average of 29% to an average of 43%;

of the apparent colour index (ACI) which shifted from an average of 27% to an average of 47%;

the overall residence times in the plants, over the course of these tests, was of the order of 25 minutes.

The invention claimed is:

1. A method of treating water utilizing chemical treatment and ballasted flocculation to remove dissolved and suspended solids, the method comprising:

a. mixing water in an oxidation reactor with hydrogen peroxide and a transition metal salt;

b. reacting the hydrogen peroxide with the transition metal salt to yield hydroperoxyl radicals and reacting the hydroperoxyl radicals with the transition metal to yield metal oxides;

c. adsorbing dissolved and suspended solids onto the metal oxides creating adsorbed solids in the water;

d. contacting the water, suspended solids and adsorbed solids with a flocculant and a ballast including insoluble granular material, in a flocculation reactor, and yielding a mixture that includes ballasted floc where the ballasted floc comprises the insoluble granular material, metal oxides, and adsorbed solids;

e. separating treated water from the ballasted floc by settling the ballasted floc in a settling tank where the ballasted floc forms a part of a sludge settled in a settling tank;

f. transferring the sludge from the settling tank to a separation device and separating the sludge into a stream containing the ballast and relatively heavy solids and a sludge stream having relatively lighter solids including metal oxides; recycling at least a portion of the stream having the ballast and relatively heavy solids to the flocculation reactor and mixing the ballast and heavy solids with the water and the flocculant; and g. recycling the sludge stream having the relatively lighter solids including metal oxides to the oxidation reactor and mixing the relatively lighter solids including the metal oxides with the water, hydrogen peroxide and the transition metal salt in the oxidation reactor wherein the recycled metal oxides improves the kinetics of the oxidation reactions and generally reduces treatment time.

2. The method of claim 1 further including treating the water such that organic contaminants, colloidal pollution, and dissolved pollution is reduced simultaneously.

3. The method of claim 1 wherein the transition metal salt includes iron or copper.

4. The method of claim 3 wherein the transition metal salt comprises ferrous sulfate.

5. The method of claim 4 further including reacting iron with the hydroperoxyl radical to generate iron oxyhydroxide.

6. The method of claim 4 further including maintaining the concentration of ferrous sulfate in the oxidation reactor between approximately 50 and approximately 200 mg/L.

7. The method of claim 1 further including maintaining the concentration of hydrogen peroxide in the oxidation reactor between approximately 6 and approximately 11 mg/L.

8. The method of claim 1 wherein the treatment of the water reduces the concentration of chemical oxygen demand (COD) in the water.

9. The method of claim 1 further including contacting the water in the oxidation reactor with hydrogen peroxide for a period of approximately 2.5 to approximately 45 minutes.

10. The method of claim 9 further including contacting the water in the oxidation reactor with hydrogen peroxide for a period of approximately 7 to approximately 20 minutes.

11. The method of claim 1 wherein steps (a) through (g) are performed in less than 1 hour.

12. The method of claim 1 wherein the process includes at least one pH adjustment.

13. The method of claim 12 further including at least one pH adjustment in the oxidation reactor, so as to maintain the pH therein between approximately 3 and approximately 6, or upstream or downstream from the settling tank, so as to maintain the pH therein between approximately 6 and approximately 9.

14. The method of claim 5 wherein the sludge stream having the relatively lighter solids includes iron oxyhydroxide and the method includes recycling the iron oxyhydroxide to the oxidation reactor and increasing the amount of adsorbent material in the oxidation reactor.

15. The method of claim 1 wherein the ballasted floc includes metals, metal oxides and metal oxyhydroxides.

16. The method of claim 1 including mixing a coagulant with the water downstream of the oxidation reactor in a coagulation reactor.

17. The method of claim 16 wherein the coagulant is ferric chloride.

18. A method of treating water having impurities including dissolved solids, suspended solids and colloidal matter, the method comprising:
 a. directing the water to an oxidation reactor;
 b. mixing hydrogen peroxide and a transition metal salt with the water in the oxidation reactor;
 c. after mixing the hydrogen peroxide and transition metal salt with the water in the oxidation reactor, directing the water to a flocculation zone located downstream of the oxidation reactor;
 d. mixing a flocculant and a ballast with the water in the flocculation zone where the ballast comprises insoluble granular material denser than water;
 e. wherein mixing the flocculant and the ballast with the water forms a floc mixture including ballasted floc having metals deposited on the ballasted floc;
 f. settling the floc mixture and separating treated water from the floc mixture which yields a sludge including the ballasted floc with the metals deposited thereon;
 g. separating the ballast from the sludge and recycling the ballast to the flocculation zone and mixing the ballast with the water and ballast floc in the flocculation zone; and
 h. after separating the ballast from the sludge, recycling at least a portion of the sludge including precipitated metals to the oxidation reactor and mixing the sludge with the hydrogen peroxide and the transition metal salt in the oxidation reactor.

19. The method of claim 18 wherein separating ballast from the sludge includes directing the sludge, including the ballasted floc, to a hydrocyclone and separating the ballast from the sludge in the hydrocyclone which produces an underflow and directing at least a portion of the underflow from the hydrocyclone to the flocculation zone and wherein the hydrocyclone produces an overflow and the method includes directing at least a portion of the overflow to the oxidation reactor and mixing the overflow with the hydrogen peroxide and the transition metal salt.

20. The method of claim 18 characterized in that the time period separating the mixing of the hydrogen peroxide with the water and the separation of the treated water is less than one hour.

21. The method of claim 18 including mixing a coagulant with the water at a point downstream of the oxidation reactor.

22. The method of claim 2 wherein the residency time of the water in contact with the hydrogen peroxide in the oxidation reactor is between 2.5 and 45 minutes.

23. The method of claim 18 wherein settling the floc mixture comprises settling the floc mixture in a settling tank at a mirror rate of at least 15 m/h.

* * * * *